Dec. 7, 1926.
C. BLONIGEN
GLARESHIELD
Filed August 20, 1925
1,609,396
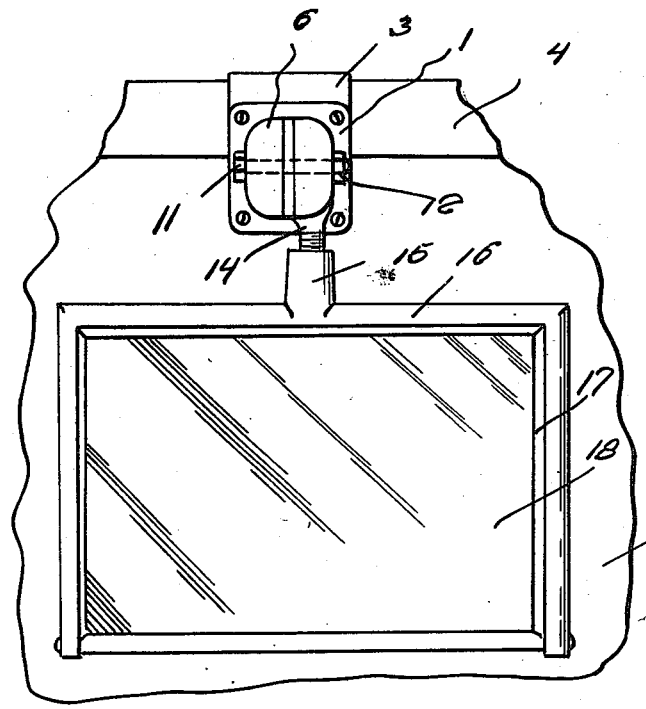
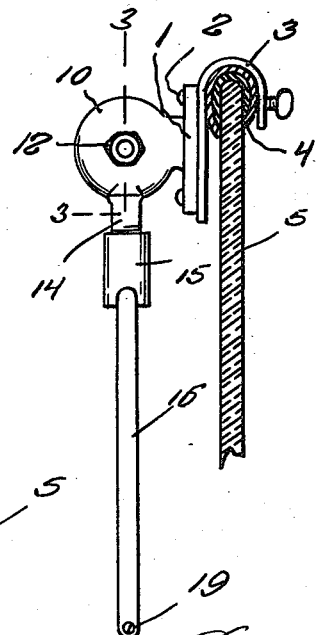
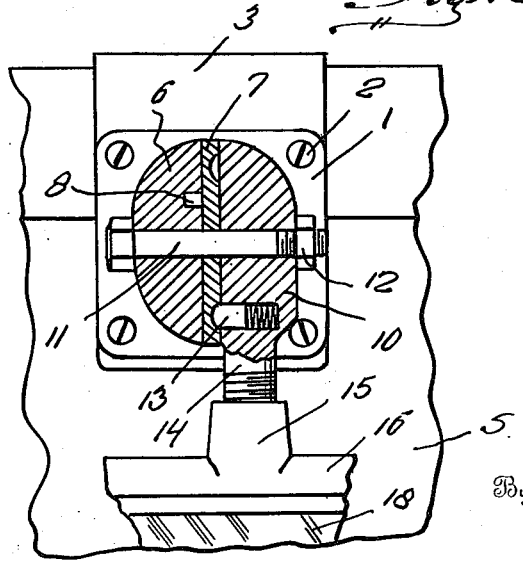
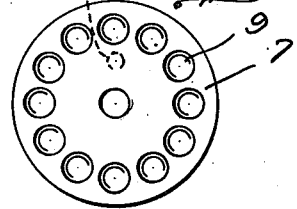
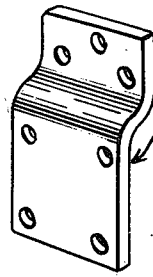
Inventor
C. Blonigen
By Clarence A. O'Brien
Attorney Patented Dec. 7, 1926.

1,609,396

UNITED STATES PATENT OFFICE.

CHRISTOPHER BLONIGEN, OF MELROSE, MINNESOTA.

GLARESHIELD.

Application filed August 20, 1925. Serial No. 51,440.

This invention relates to improvements in glare shields, and has reference more particularly to an attachment adapted to be associated with the windshield of an automobile, whereby the driver will be protected from the glare of the headlights of approaching vehicles, as well as from the sun rays.

A further object of the invention is to provide a glare shield attachment of the above mentioned character, wherein means is associated therewith for supporting the visor or screen, in a desired adjusted position, with respect to the windshield.

A further object of the invention is to provide a glare shield attachment of the above mentioned character, which is of such construction as to permit the same to be readily and easily attached in position, on the windshield frame of an automobile, without necessitating any alteration of the parts of the automobile.

A still further object is to provide a glare shield attachment of the above mentioned character, which is simple in construction, inexpensive, strong and durable, and further well adapted for the purposes for which it is designed.

Other objects and advantages of this invention will become apparent during the course of the following description.

In the accompanying drawing, forming a part of this specification, and in which like numerals designate like parts throughout the same:

Figure 1 is a fragmentary view of an automobile windshield showing the improved glare shield mounted thereon and swung down to operative position.

Figure 2 is a side view of Figure 1.

Figure 3 is an enlarged detail sectional and elevational view taken approximately upon the plane of the line 3—3 of Figure 2.

Figure 4 is a side view of a face plate constituting a part of the invention.

Figure 5 is a perspective view of a different embodiment of attaching bracket.

Referring to the drawing in detail, the reference character 1 designates a base plate which is provided at its corners with counter sunk openings for passage of fastening screws 2 which serve to connect it with the attaching bracket 3. The attaching bracket in this instance is in the form of a flat plate which has one end bent over the rim 4 of the automobile windshield 5, as shown plainly in Figure 2. Extending outwardly from and formed integral with this base plate is a circular and rounded extension 6, the inner face of which is flat. This extension and base plate is preferably in the form of a one-piece aluminum casting. A hard metal face plate, or disc 7, however is placed against the flat face of the extension and is provided with a dowel pin 8 fitting into a socket provided therefor. The effective side of this face plate is formed around its margin with a circumferential row of depressions 9 forming plunger receiving seats. The parts 1, 6 and 7, may be said to be a mounting. Cooperable with the face plate 7 is a head 10 of a shape somewhat similar to the extension 6. This head together with the extension and face plate are formed with aligned holes, and a pivot bolt 11 extends therethrough, there being a clamping nut 12 on the threaded end of this bolt for positively holding the head in different adjusted positions. It will be noted from Figure 3 that this head is formed with a socket, and a spring pressed retaining plunger 13 is fitted into this socket, and is adapted to be selectively forced into any one of the seats 9. The head is provided with a screw-threaded shank 14, and this shank is tapped into a socket 15 carried by the top bar of a U-shaped frame 16. This frame is intended to removably receive the glare shield proper comprising the metal rim 17, and celluloid plate 18. As shown in Figures 1 and 2, retaining screws or their equivalent 19 are carried by the free ends of the arms of the U-shaped frame, and these connect with the rim of the shield to hold it in place.

In attaching the mounting to the windshield, various kinds of brackets may be needed for the different types of windshields on the various kinds or makes of automobiles. The brackets shown in Figures 1 and 2 adapts the invention for application to the modern Ford automobile. In Figure 5, however, I have shown a different shape of bracket 20 which adapts the device to be mounted on the old style Ford automobile. The different kinds of wagons have not been shown as these do not constitute a part of the invention.

It is thought that by carefully considering the description in connection with the drawings, persons familiar with structures of this class will be able to obtain a clear understanding of the same. Therefore, a more lengthy description is thought unnecessary.

While the preferred embodiment of the invention has been shown and described, it is to be understood that minor changes coming within the field of invention claimed may be resorted to if desired.

Having thus described the invention, what I claim as new is:—

As a new article of manufacture, a mounting adapted to be used in association with a glare shield structure of the kind stated, said mounting comprising a base plate provided with an integral extension, said extension having a flat side and being provided with a bolt hole at its center, a face plate arranged against said flat side, said face plate having a pin extending into a socket in said extension and being further provided with a circumferential row of plunger receiving seats, a flat faced head, a spring pressed plunger carried by said head and extending through and beyond the flat face and into one of said seats, a screw threaded shank carried by a peripheral portion of said head, a U-shaped shield carrying frame, the top bar of said frame being provided with a screw threaded socket, and said shank being tapped into said socket.

In testimony whereof I affix my signature.

CHRISTOPHER BLONIGEN.